United States Patent
Okamori

(10) Patent No.: US 7,764,708 B2
(45) Date of Patent: Jul. 27, 2010

(54) DATA TRANSMISSION SYSTEM, HEADER-INFORMATION ADDING DEVICE, DATA-FORMAT CONVERTING DEVICE, AND DATA TRANSMISSION METHOD

(75) Inventor: Atsushi Okamori, Tokyo (JP)

(73) Assignee: Sony Corporation, Tokyo (JP)

( * ) Notice: Subject to any disclaimer, the term of this patent is extended or adjusted under 35 U.S.C. 154(b) by 1330 days.

(21) Appl. No.: 10/215,706

(22) Filed: Aug. 9, 2002

(65) Prior Publication Data
US 2003/0053486 A1 Mar. 20, 2003

(30) Foreign Application Priority Data
Aug. 10, 2001 (JP) ............ P2001-244007

(51) Int. Cl.
*H04J 3/22* (2006.01)
(52) U.S. Cl. ............ 370/466; 370/474; 370/476
(58) Field of Classification Search ............ 370/474, 370/475, 476, 466, 467
See application file for complete search history.

(56) References Cited

U.S. PATENT DOCUMENTS 5,309,432 A * 5/1994 Kanakia ............ 370/412
5,377,051 A * 12/1994 Lane et al. ............ 386/81
6,327,621 B1 * 12/2001 Lee et al. ............ 709/227
2002/0073325 A1 * 6/2002 Ho et al. ............ 713/189
2002/0181400 A1 * 12/2002 Zheng et al. ............ 370/235
2002/0196755 A1 * 12/2002 Hidaka et al. ............ 370/335
2003/0079013 A1 * 4/2003 I'Anson ............ 709/224

FOREIGN PATENT DOCUMENTS

JP 10-271146 * 10/1998

* cited by examiner

*Primary Examiner*—Jayanti K Patel
*Assistant Examiner*—Bo Hui A Zhu
(74) *Attorney, Agent, or Firm*—K&L Gates LLP

(57) ABSTRACT

A header-information adding unit adds a device ID for identifying a device at a sending node and a device ID for identifying a device at a receiving node to a header of a packet sent by the sending node. The packet is transmitted to a data-format converting device by a packet transmitting unit. In the data-format converting device, the packet is received by a packet receiving unit, and is sent to a unique-information detecting unit. The unique-information detecting unit detects the device IDs from the header of the packet, and sends them to a data-format converting unit with the packet data. The data-format converting unit determines the data formats used by the sending node and the receiving node based on the detected device IDs, and converts the data format of the packet sent by the sending node into the data format of by the receiving node.

14 Claims, 9 Drawing Sheets

FIG. 11

| | | |
|---|---|---|
| .... | .... | .... |
| DEVICE ID = DVCAM1 | ENCODING FORMAT = DV | DECODING FORMAT = NULL |
| DEVICE ID = TERM1 | ENCODING FORMAT = MPEG2 | DECODING FORMAT = MPEG2 |
| DEVICE ID = PDA1 | ENCODING FORMAT = NULL | DECODING FORMAT = MPEG4 |
| .... | .... | .... |

95a
95b
95c

DATA TRANSMISSION SYSTEM, HEADER-INFORMATION ADDING DEVICE, DATA-FORMAT CONVERTING DEVICE, AND DATA TRANSMISSION METHOD

BACKGROUND OF THE INVENTION

The present invention relates to a data transmission system, a header-information adding device, a data-format converting device, and a data transmission method. More particularly, the present invention relates to a data transmission system, a header-information adding device, a data-format converting device, and a data transmission method for nodes connected to a network.

It has become more and more common to transmit applications having audio/visual (A/V) information, including moving pictures and still images, over a network. Sometimes the transmission of these applications is done commercially.

Since a broadband network is required to transmit such applications having A/V information, typically, information compression techniques such as JPEG (Joint Photographic Experts Group), MPEG (Moving Picture Experts Group), and ATRAC (Adaptive Transform Acoustic Coding) have been used for high-quality moving image data transmission.

Compression techniques such as JPEG, MPEG, and ATRAC often use a unique compression format, and are generally not compatible with one another. Thus, an encoder at a sending node and a decoder at a receiving node must employ the same data format to transmit such multimedia information over a network. Without compatibility, data sent from the sending node cannot be handled as active data by the receiving node, and therefore the receiving node cannot recognize the data sent from the sending node.

A data transmission system and method capable of successfully exchanging data between a sending node and a receiving node in which the data formats are incompatible with each other, is disclosed in Japanese Unexamined Patent Application Publication No. 10-271146. In this system and method, an intermediate node for converting the data format is provided between the data sending and receiving nodes, and converts the sending-node data format so that the data from the sending node can be handled as active data by the receiving node.

In the data transmission system and method disclosed in the above cited reference, however, the intermediate node must know the data formats that can be handled by the sending node and the receiving node in advance. Therefore, a problem with this system and method is that the sending node and the receiving node must comply with a special protocol by which the intermediate node specifies the data format at the sending node and at the receiving node.

SUMMARY OF THE INVENTION

Accordingly, the present invention provides a data transmission system, a header-information adding device, a data-format converting device, and a data transmission method capable of performing effective data transmission without requiring the data sending and receiving nodes to comply with a special protocol.

One embodiment of the present invention includes a data transmission system for nodes connected to a network. The data transmission system includes a header-information adding device and a data-format converting device. In the header-information adding device, a header-information adding unit adds information unique to a sending node and information unique to a receiving node to a header of a transmission packet. A packet transmitting unit then transmits the transmission packet. In the data-format converting device, a packet receiving unit receives the transmission packet transmitted by the packet transmitting unit. A unique-information detecting unit detects the information unique to the sending node and the information unique to the receiving node from the header of the transmission packet. A data-format converting unit converts the data format of the data transmitted by the sending node into the data format of the data received by the receiving node based on the information unique to the sending node and the receiving node, which have been detected by the unique-information detecting unit.

In the data transmission system, therefore, information unique to a sending node and to a receiving node are added to a header of a transmission packet by the header-information adding unit. The transmission packet is transmitted by the packet transmitting unit to the data-format converting device, and is then received by the packet receiving unit. The information unique to the sending node and the receiving node are detected from the received packet by the unique-information detecting unit. Based on the unique information, the data-format converting unit converts the data format of data sent by the sending node into the data format of data received by the receiving node. Thus, the above system allows effective data conversion to be easily performed without requiring the sending and receiving nodes to comply with a special protocol.

In another embodiment, the present invention includes a header-information adding device for nodes connected to a network. The header-information adding device includes a header-information adding unit and a packet transmitting unit. The header-information adding unit adds information unique to a sending node and to a receiving node to a header of a transmission packet. The packet transmitting unit transmits the transmission packet, including the information unique to the sending node and the receiving node, to a data-format converting device for converting the data format.

In the header-information adding device, therefore, information unique to the sending node and to the receiving node are added to a header of a transmission packet by the header-information adding unit. The transmission packet is then transmitted by the packet transmitting unit to the data-format converting device for data format conversion. This device allows effective data conversion without requiring the sending and receiving nodes to comply with a special protocol.

In a further embodiment, the present invention provides a data-format converting device for nodes connected to a network. The data-format converting device includes a packet receiving unit, a unique-information detecting unit, and a data-format converting unit. The packet receiving unit receives a packet having information unique to a sending node and to a receiving node added to a header thereof. The unique-information detecting unit detects, from the header of the packet received by the packet receiving unit, the information unique to the sending node and to the receiving node. Based on the information unique to the sending node and to the receiving node, which have been detected by the unique-information detecting unit, the data-format converting unit converts the data format of the data transmitted by the sending node into the data format of the data received by the receiving node.

In the header-information adding device, therefore, a packet having information unique to the sending node and to the receiving node, which is added to a header thereof, is received by the packet receiving unit. The information unique to the sending node and to the receiving node are detected in the received packet by the unique-information detecting unit. Based on the unique information, the data-format converting device converts the data format of data sent by the sending node into the data format of data received by the receiving node. This allows effective data conversion to be easily performed without requiring the sending and receiving nodes to comply with a special protocol.

In still another embodiment, the present invention provides a data transmission method for nodes connected to a network. The data transmission method includes the following steps: a header-information adding step for adding information unique to a sending node and to a receiving node to a header of a transmission packet; a packet transmitting step for transmitting the transmission packet; a packet receiving step for receiving the transmitted transmission packet; a unique-information detecting step for detecting, from the header of the transmission packet, the information unique to the sending node and to the receiving node; and a data-format converting step for; converting the data format of the data transmitted by the sending node into the data format of the data received by the receiving node.

In the data transmission method, therefore, the header-information adding step adds information unique to the sending node and to the receiving node to a header of a transmission packet. The packet transmitting step then transmits the transmission packet to the data-format converting device, and the packet receiving step receives the transmitted transmission packet. The unique-information detecting step then detects the information unique to the sending node and to the receiving node. The data-format converting step, converts the data format of data sent by the sending node into the data format of data received by the receiving node based on the unique information.

Therefore, the present invention allows effective data conversion to be easily performed without requiring the sending and receiving nodes to comply with a special protocol.

Additional features and advantages of the present invention are described in, and will be apparent from, the following Detailed Description of the Invention and the figures.

BRIEF DESCRIPTION OF THE FIGURES

FIG. 11 is a table showing the correspondence between device IDs and data formats.

DETAILED DESCRIPTION OF THE INVENTION

An embodiment of the present invention is now described with reference to the drawings.

Figure 1:
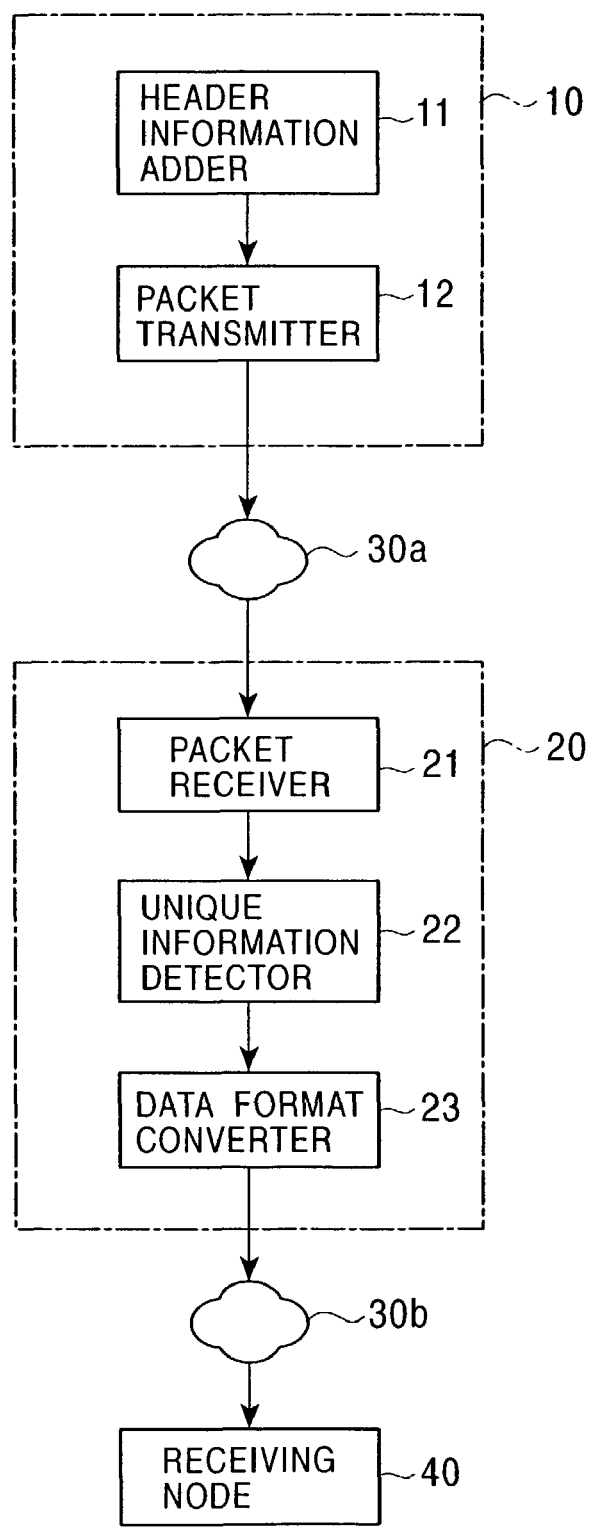
FIG. 1 is a block diagram showing one embodiment of a data transmission system according to the present invention.

FIG. 1 is a block diagram showing the principle of a data transmission system according to one embodiment of the present invention. The data transmission system shown in FIG. 1 includes a header-information adding device 10, a data-format converting device 20, networks 30a and 30b, and a receiving node 40.

The header-information adding device 10 is connected to the data-format converting device 20 via the network 30a. The data-format converting device 20 is connected to the receiving node 40 via the network 30b. The header-information adding device 10 includes a header-information adding unit 11 and a packet transmitting unit 12.

Figure 2:
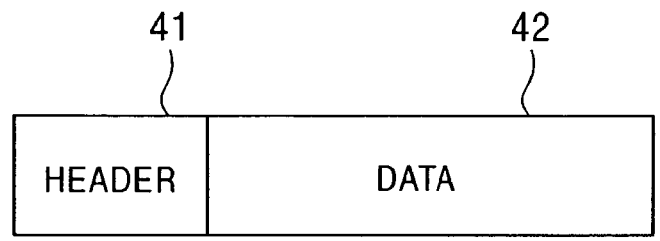
FIG. 2 is a diagram of the data format of a packet.

The header-information adding unit 11 adds information unique to a sending node (not shown) and to the receiving node 40 to a header of a packet. FIG. 2 shows the format of the packet. The packet is formed of a header 41 and data 42. The information unique to the sending node and to the receiving node 40 are added to the header 41. The term "information unique to" or "unique information" includes the device type or model type, which indicates, for example, that the sending node is an X-type DV (digital video) camera manufactured by company A and the receiving node 40 is a Y-type personal computer manufactured by company B. The packet having such unique information added thereto is sent to the packet transmitting unit 12. The packet transmitting unit 12 transmits the packet sent from the header-information adding unit 11 to the data-format converting device 20 via the network 30a.

The data-format converting device 20 includes a packet receiving unit 21, a unique-information detecting unit 22, and a data-format converting unit 23.

The packet receiving unit 21 receives the packet transmitted via the network 30a from the packet transmitting unit 12. The packet receiving unit 21 then sends the received packet to the unique-information detecting unit 22.

The unique-information detecting unit 22 detects the information contained in the header of the packet sent from the packet receiving unit 21; i.e., the information unique to the sending node and to the receiving node 40. In this example, the unique-information detecting unit 22 detects the information indicating that the sending node is an X-type DV camera manufactured by company A and the receiving node 40 is a Y-type personal computer manufactured by company B. The detected unique information is then sent to the data-format converting unit 23 together with the packet.

The data-format converting unit 23 converts the data format of the data contained in the packet according to the unique information sent from the unique-information detecting unit 22. It is assumed that, for example, information indicating that the data encoded by the X-type DV camera manufactured by company A is of the DV format and the data decoded by the Y-type personal computer manufactured by company B is of the MPEG-2 format, is stored in an internal memory (not shown) of the data-format converting device 20. If the information unique to the sending node sent from the unique-information detecting unit 22 indicates the X-type DV camera manufactured by company A, and the information unique to the receiving node 40 indicates the Y-type personal computer manufactured by company B, then the data-format converting unit 23 refers to the information stored in the memory to convert the packet data from the DV format to the MPEG-2 format.

The packet whose data format has been converted by the data-format converting unit 23 is transmitted to the receiving node 40 via the network 30b.

Figure 3:
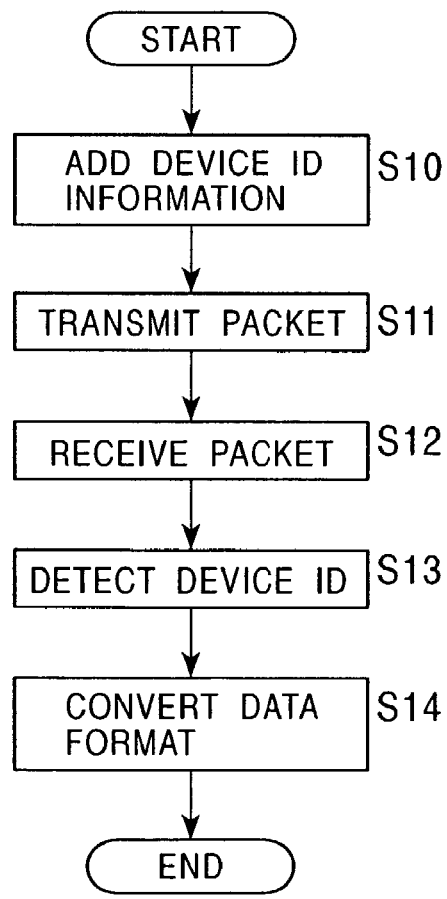
FIG. 3 is a flowchart showing a processing sequence of the data transmission system.

The operation of the data transmission system shown in FIG. 1 is now described with reference to the flowchart in FIG. 3 showing a processing sequence of the data transmission system.

It is assumed herein that a sending node (not shown) transmits data to the receiving node 40. For convenience of illustration, the sending node is an X-type DV camera manufactured by company A, and the receiving node 40 is a Y-type personal computer manufactured by company B. Furthermore, information indicating that the data encoded by the X-type DV camera manufactured by company A is of the DV format and the data decoded by the Y-type personal computer manufactured by company B is of the MPEG-2 format is stored in, for example, an internal memory (not shown) of the data-format converting device 20.

First, packet data transmitted by the X-type DV camera manufactured by company A is sent to the header-information adding unit 11. The header-information adding unit 11 adds both the information unique to the sending node and to the receiving node 40 as a destination to the header of the packet. Thus, both the information indicating the X-type DV camera manufactured by company A and the information indicating the Y-type personal computer manufactured by company B are added to the header (step S10). The header-information adding unit 11 then sends the resulting packet to the packet transmitting unit 12.

The packet transmitting unit 12 transmits the packet sent from the header-information adding unit 11 to the data-format converting device 20 via the network 30*a* (step S11). The packet transmitted by the packet transmitting unit 12 is received by the packet receiving unit 21 in the data-format converting device 20 (step S12). The received packet is then sent to the unique-information detecting unit 22.

The unique-information detecting unit 22 detects both the information unique to the sending node and to the receiving node 40 from the header of the packet sent from the packet receiving unit 21. Thus, the information indicating that the sending node is an X-type DV camera manufactured by company A and the receiving node 40 is a Y-type personal computer manufactured by company B is detected (step S13).

The unique-information detecting unit 22 then sends the detected information and the packet to the data-format converting unit 23.

The data-format converting unit 23 converts the packet data according to the unique information sent from the unique-information detecting unit 22 (step S14). Specifically, the data-format converting unit 23 refers to the information stored in the memory to recognize that the data encoded by the X-type DV camera manufactured by company A is of the DV format and the data decoded by the Y-type personal computer manufactured by company B is of the MPEG-2 format. Then, the data-format converting unit 23 converts the packet data from the DV format to the MPEG-2 format.

The packet whose data format has been converted into the MPEG-2 format by the data-format converting unit 23 is transmitted to the receiving node 40 via the network 30*b*. The MPEG-2 format data can be decoded by the Y-type personal computer manufactured by company B, thus allowing a user to view the video transmitted by the DV camera.

It should be appreciated that the above description has been made in the context of a single sending node and a single receiving node; however, the data transmission may also be performed between a number of sending nodes and a number of receiving nodes. In this case, a number of header-information adding devices 10 corresponding to the number of sending nodes are connected to the network 30*b*. The number of receiving nodes are also connected to the network 30*b*.

The present invention has been discussed in the context of conversion from the DV format to the MPEG-2 format; however, it should be appreciated, that the present invention may be applied to any format conversion.

Accordingly, both source node information and destination node information are added to the header of a packet to be transmitted, and the converted format is determined based on the node information. Thus, effective data transmission can be easily achieved between nodes having different data formats.

The data transmission system according to the present invention is now described in conjunction with a specific implementation.

Figure 4:
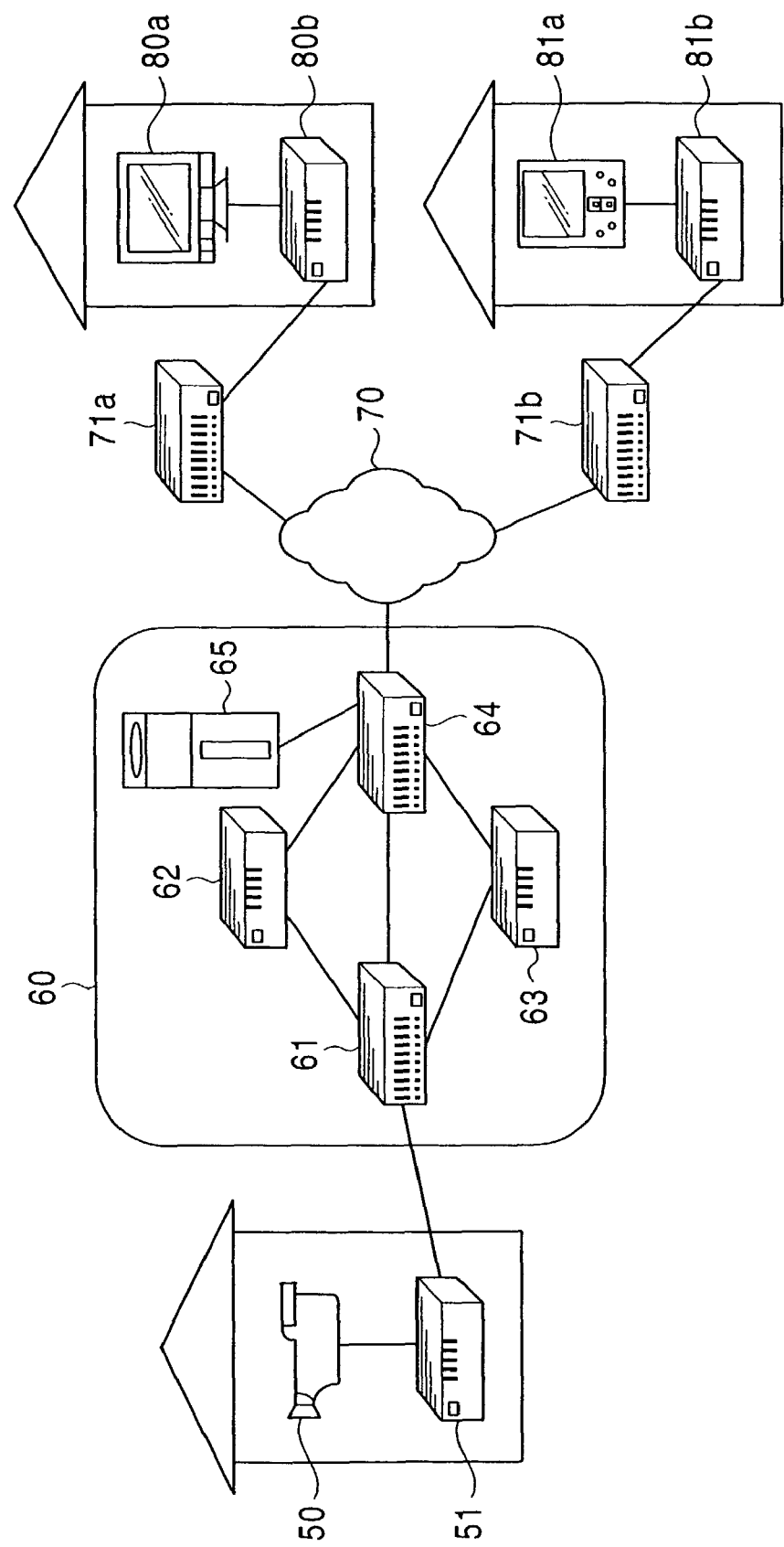
FIG. 4 is a schematic diagram showing an implementation of the data transmission system according to the present invention.

FIG. 4 is a schematic diagram showing an implementation of the data transmission system according to the present invention. The data transmission system shown in FIG. 4 includes a DV camera 50, home routers 51, 80*b* and 81*b*, an access point 60, Internet 70, edge routers 71*a* and 71*b*, a terminal device 80*a*, and a PDA (personal digital assistant) 81*a*. The access point 60 is formed of edge routers 61 and 64, a built-in DV-to-MPEG2 converter router 62, a built-in DV-to-MPEG4 converter router 63, and a billing data server 65. The DV camera 50 outputs a DV (digital video) signal as IP (Internet protocol) packets to the edge router 61 in the access point 60 via the home router 51 according to a protocol stack.

Figure 5:
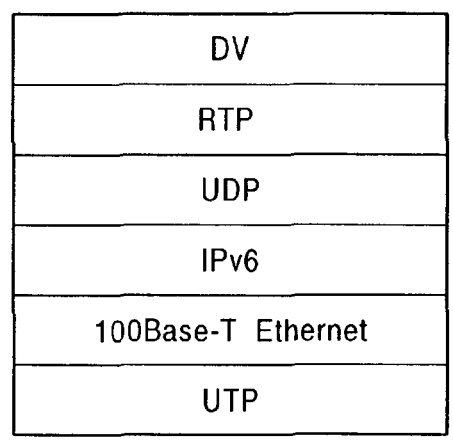
FIG. 5 is a diagram illustrating a protocol stack.

FIG. 5 shows the protocol stack. In the protocol stack, UTP (Unshielded Twisted Pair) indicating the physical medium at the physical layer is the underlying layer, followed by 100Base-T Ethernet indicating the communication scheme at the data link layer, IPv6 indicating the protocol at the network layer, UDP (User Datagram Protocol) indicating the protocol at the transport layer, RTP (Real-Time Protocol) indicating the protocol at the session layer and DV indicating the protocol at the application layer.

Figure 6:
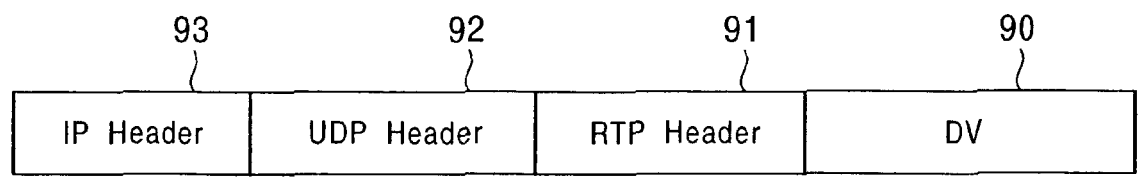
FIG. 6 is a diagram of the transmission format of an IP packet output from a DV camera.

FIG. 6 shows the transmission format of an IP packet output from the DV camera 50. In the IP packet, an RTP header 91 for delivering audio or video data streams in real time, a UDP header 92 for using IP functionality from an application, and an IP header 93 containing address information for nodes allocated on a network and the like are added to DV data 90 which indicates the data of the DV camera 50.

The formats of the RTP header 91, the UDP header 92, and the IP header 93 are briefly described in the following paragraphs.

Figure 7:
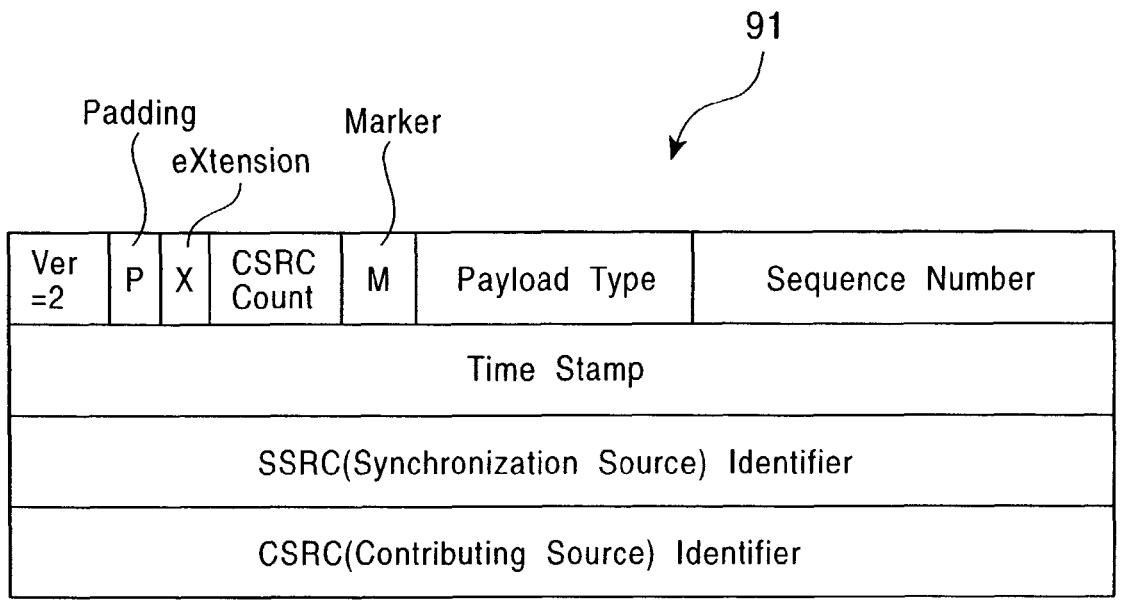
FIG. 7 is a diagram of the format of an RTP header.

FIG. 7 shows the format of the RTP header 91. The RTP header 91 is formed of a field (Ver=2) indicating the version; a field (Padding) indicating whether or not one or more padding octets are inserted at the end of the packet; a field (eXtension) indicating whether or not an extension header is inserted; a field (CSRC Count) indicating the number of CSRC identifiers contained in the packet as described below; a field (Marker) indicating whether or not the packet stream contains a mark; a field (Payload Type) indicating the payload type; a field (Sequence Number) for organizing the data for detecting packet loss; a field (Time Stamp) indicating a time stamp; a field (SSRC (Synchronization Source Identifier)) indicating a sender ID, and a field (CSRC (Contributing Source) Identifier) indicating a contributing-source ID.

Figure 8:
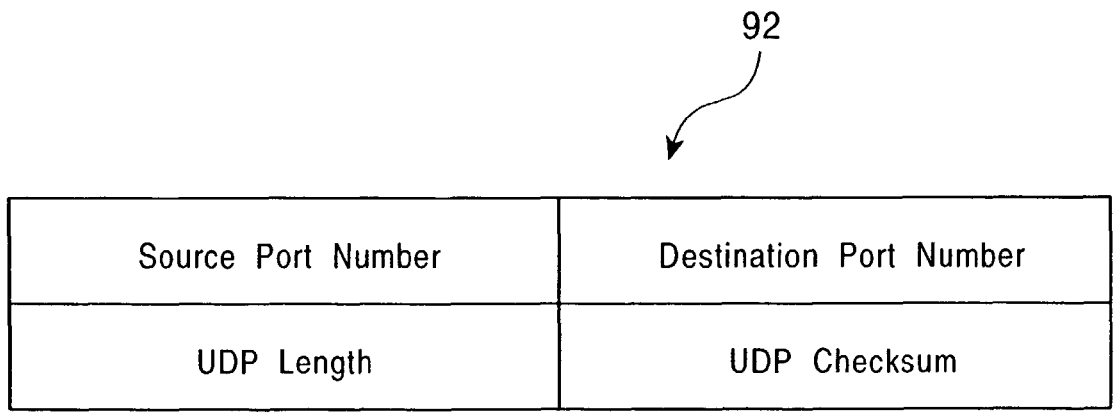
FIG. 8 is a diagram of the format of a UDP header.

FIG. 8 shows the format of the UDP header 92. The UDP header 92 is formed of fields (Source Port Number and Destination Port Number) indicating applications running at a corresponding IP address, a field (UDP Length) indicating the UDP length, and a field (UDP Checksum) indicating the checksum.

Figure 9:
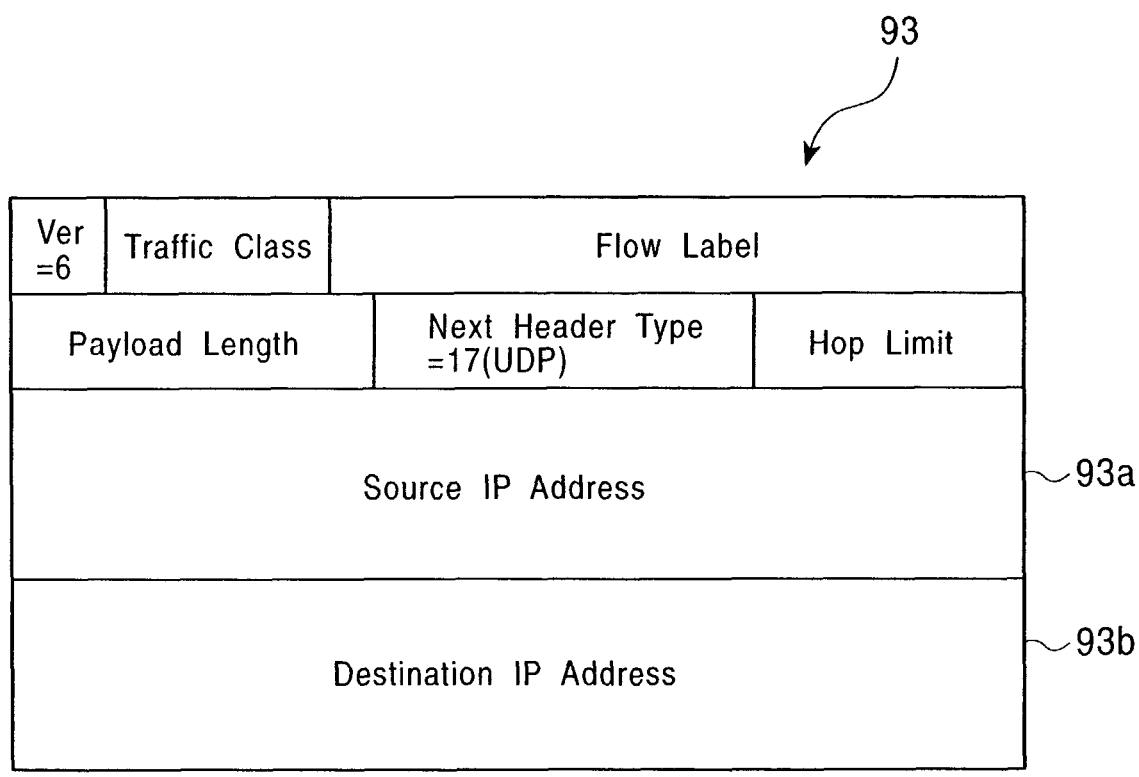
FIG. 9 is a diagram of the format of an IP header.

FIG. 9 shows the format of the IP header 93. The IP header 93 is formed of a field (Ver=6) indicating the version; a field (Traffic Class) indicating the priority; a field (Flow Label) indicating a request for special service; a field (Payload Length) indicating the payload length; a field (Next Header Type=17 (UDP)) indicating the type of the subsequent header; a field (Hop Limit) which decrements by one each time the packet passes through a router; a field (Source IP Address) 93*a* indicating the IP address of the source; and a field (Destination IP Address) 93*b* indicating the IP address of the destination.

Figure 10:
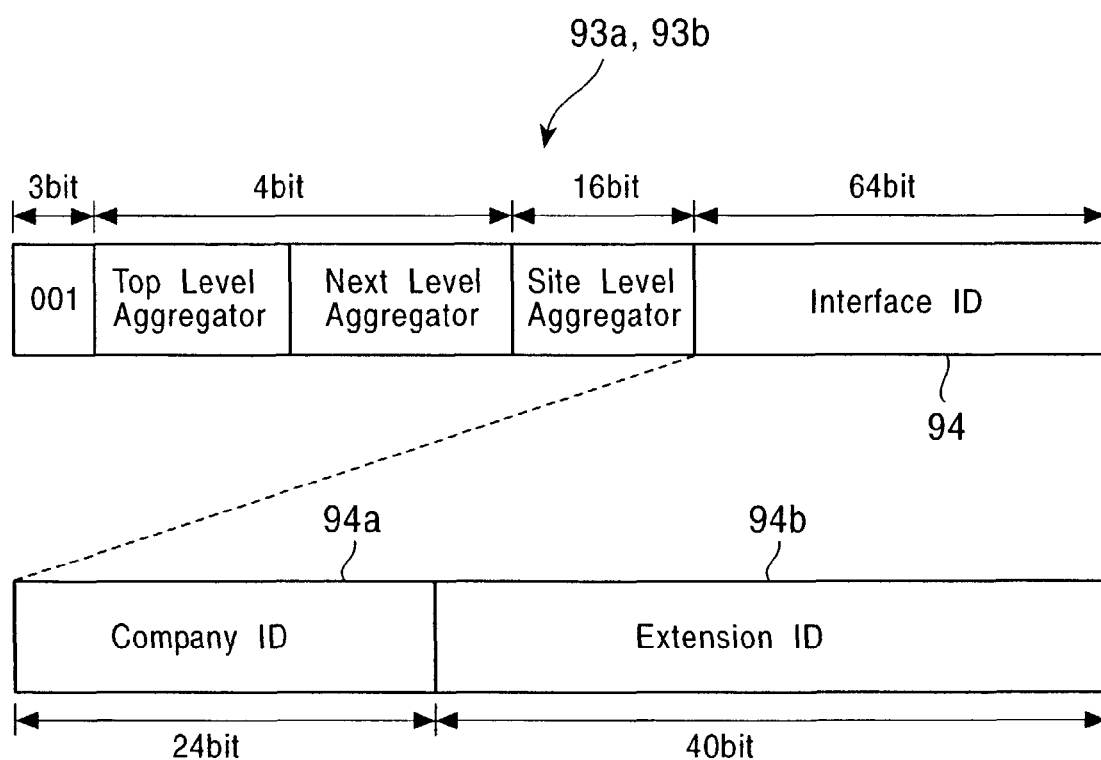
FIG. 10 is a diagram of the format of an IP address.

FIG. 10 shows the format of the IP addresses 93*a* and 93*b*. In the IP addresses 93*a* and 93*b*, the upper twenty-three bits (001, Top Level Aggregator, Next Level Aggregator, and Site Level Aggregator) are referred to as a "prefix" for route searching, whose value is distributed from a router. The lower sixty-four bits represent an interface ID 94, which is generated by a terminal device. As shown in FIG. 10, the interface ID 94 corresponds to EUI-64 (sixty-four-bit extended unique identifier), in which a company ID 94*a* in the upper twenty-four bits contains a vendor ID indicating a vendor identifier and an extension ID 94*b* in the remaining forty bits contains in a specific bit stream a device ID indicating a device identifier. Thus, the source device ID and the destination device ID are stored in the Extension ID 94*b* of the IP addresses.

The home router 51 is adapted to transmit IP packets sent from the DV camera 50 to the access point 60 according to the IP address. The access point 60 is a provider access point, and is provided with the edge routers 61 and 64, the built-in DV-to-MPEG2 converter router 62, the built-in DV-to-MPEG4 converter router 63 and the billing data server 65.

The edge router 61 detects the source and destination device IDs from the IP packets transmitted from the home router 51 to recognize, the data formats used by the source and destination devices based on the device IDs. For example, information shown in FIG. 11, which indicates a table showing the correspondence between device IDs and data formats, is stored in an internal memory (not shown) of the edge router 61. In FIG. 11, data 95*a* indicates that a device having a device ID of DVCAM1 is capable of encoding data of the DV format and is not capable of decoding data. Data 95*b* indicates that a device having a device ID of TERM1 is capable of encoding data of the MPEG-2 format and is capable of decoding data of the MPEG-2 format. Data 95*c* indicates that a device having a device ID of PDA1 is not capable of encoding data and is capable of decoding data of the MPEG-4 format.

The edge router 61 further sends the packets to either the built-in DV-to-MPEG2 converter router 62 or the built-in DV-to-MPEG4 converter router 63 depending upon the detected data formats which are used by the source and destination devices. For example, if it is found that the data encoded by the source device is of the DV format and the data which can be decoded by the destination device is of the MPEG-2 format, the edge router 61 sends the data to the built-in DV-to-MPEG2 converter router 62. If it is determined that the data encoded by the source device is of the DV format and the data which can be decoded by the destination device is of the MPEG-4 format, the edge router 61 sends the data to the built-in DV-to-MPEG4 converter router 63. If both the source and destination devices handle the same data formats, the edge router 61 sends the data to the edge router 64. Furthermore, the built-in DV-to-MPEG2 converter router 62 constructs the DV signal from the incoming DV-format IP packets, and converts it into the MPEG-2 format. The converted MPEG-2 signal is again broken into IP packets, which are sent to the edge router 64.

The built-in DV-to-MPEG4 converter router 63 constructs the DV signal from the incoming DV-format IP packets, and converts it into the MPEG-4 format. The converted MPEG-4 signal is again broken into IP packets, which are sent to the edge router 64. The edge router 64 sends the received IP packets to either the edge router 71*a* or the edge router 71*b* via the Internet 70 according to the IP address.

The billing data server 65 refers to the source or destination IP address of the IP packets delivered to the edge router 64 to measure the flow rate of the packets, whereupon the billing data server 65 charges the source or destination user.

The edge routers 71*a* and 71*b* deliver the IP packets, sent via the Internet 70, to the home routers 81*a* and 81*b*, respectively. The home routers 80*b* and 81*b* send the delivered IP packets to the terminal device 80*a* and the PDA 81*a*, respectively. The terminal device 80*a* is able to reorganize the received IP packets into an MPEG-2 signal. The terminal device 80*a* is further able to decode the MPEG-2 signal for display. Furthermore, the PDA 81*a* is able to reorganize the received IP packets into an MPEG-4 signal. The PDA 81*a* is further able to decode the MPEG-4 signal for display.

The operation of the data transmission system shown in FIG. 4 is now described.

As a first example, the data of the DV camera 50 is transmitted to the terminal device 80*a*. The DV camera 50 contains the device ID of the DV camera 50, i.e., DVCAM1, and the device ID of the destination terminal device 80*a*, i.e., TERM1, at the header of an IP packet to be output. The IP packets outputted from the DV camera 50 are transmitted to the edge router 61 in the access point 60 via the home router 51.

The edge router 61 determines the data formats used by the source and destination devices from the source and destination device IDs of the IP packets based on the information (shown in FIG. 11) stored in the memory. In this example, information indicating that the encoded data is of the DV format is determined from the source device ID of DVCAM1, and information indicating that the decoding data format should be the MPEG-2 format is determined from the destination device ID of TERM1. The edge router 61 then sends the IP packets to the built-in DV-to-MPEG2 converter router 62 to convert the data format from DV format to MEPG-2 format.

The built-in DV-to-MPEG2 converter router 62 constructs a DV signal from the incoming IP packets, and converts the DV signal into an MPEG-2 signal. Then, the built-in DV-to-MPEG2 converter router 62 generates IP packets again, and sends them to the edge router 64.

The billing data server 65 refers to the source address or the destination address of the IP packets sent to the edge router 64 to measure the flow rate of the packets, whereupon the billing data server 65 charges the source or destination user based on the amount of converted data.

The edge router 64 transmits the data to the terminal device 80*a* over the Internet 70 and through the edge router 71*a* and the home router 80*b* according to the destination IP address.

As a second example, the data of the DV camera 50 is transmitted to the PDA 81*a*. The DV camera 50 contains the device ID of the DV camera 50, i.e., DVCAM1, and the device ID of the destination PDA 81*a*, i.e., PDA1, at the header of an IP packet to be output. The IP packets output from the DV camera 50 are transmitted to the edge router 61 in the access point 60 via the home router 51.

The edge router 61 determines the data formats used by the source and destination devices from the source and destination device IDs of the IP packets based on the information (shown in FIG. 11) stored in the memory. In this example, information indicating that the encoded data is of the DV format is found from the source device ID of DVCAM1, and information indicating that the decoding data format should be the MPEG-4 format is found from the destination device ID of PDA1. The edge router 61 then sends the IP packets to the built-in DV-to-MPEG4 converter router 63 in order to convert the data format from DV format to MEPG-4 format.

The built-in DV-to-MPEG4 converter router 63 constructs a DV signal from the received IP packets, and converts the DV signal into an MPEG-4 signal. Then, the built-in DV-to-MPEG4 converter router 63 generates IP packets again, and sends them to the edge router 64.

The billing data server 65 refers to the source address or the destination address of the IP packets sent to the edge router 64 to measure the flow rate of the packets, whereupon the billing data server 65 charges the source or destination user based on the amount of converted data.

The edge router 64 transmits the data to the PDA 81*a* over the Internet 70 and through the edge router 71*b* and the home router 81*b* according to the destination IP address. In the case where the source and destination devices handle the same data format, the edge router 61 sends the IP packets to the edge router 64 without data format conversion.

Accordingly, information indicating the source device ID and the destination device ID is stored in an IP packet to be transmitted, and the converted format is recognized based on the device IDs, thus allowing effective data transmission to be easily performed between devices that handle different data formats.

Another functionality of the edge router 61 shown in FIG. 4 is now described.

Figure 12:
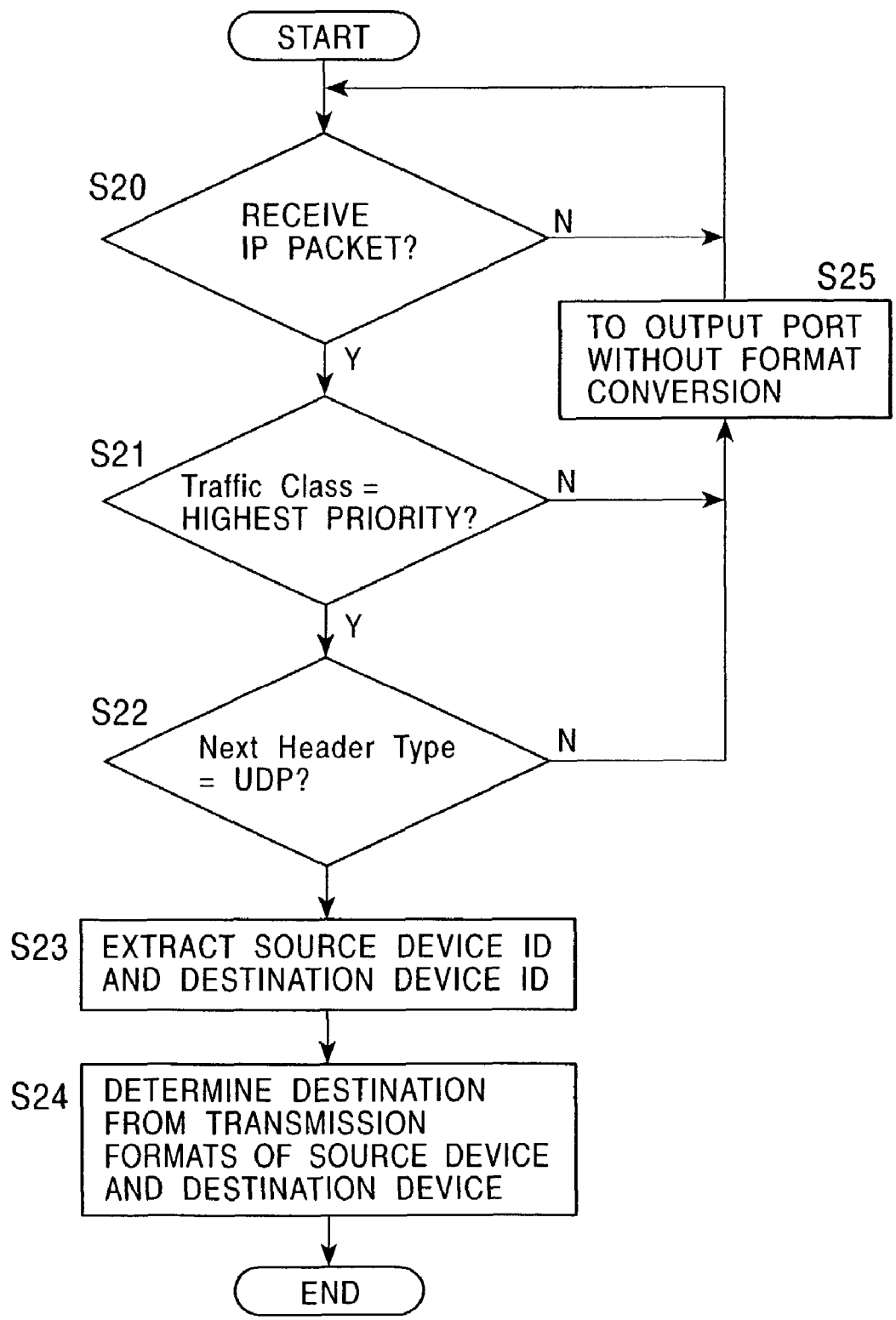
FIG. 12 is a flowchart showing a processing sequence of an edge router.

FIG. 12 is a flowchart showing a processing sequence of the edge router 61. First, the DV camera 50 stores priority information indicating the data conversion order in the "Traffic Class" field (see FIG. 9) of an IP packet to be output. The edge router 61 waits for receipt of the IP packet having the priority information stored therein (step S20).

Upon receipt of the IP packet, the edge router 61 extracts the "Traffic Class" field of the IP packet, and determines whether or not it is the highest priority data (step S21). If it is the highest priority data, it is determined that it is real-time data, and it is then determined whether or not the next header type (in the "Next Header Type" field shown in FIG. 9) is UDP (step S22). If the packet is not the highest priority data, it is output to a router (not shown in FIG. 4) which does not perform format conversion (step S25), and is received again by the edge router 61.

If it is determined in step S22 that the next header type is UDP, the edge router 61 extracts the source and destination device IDs (step S23). If the next header type is not UDP, the packet is output to a router (not shown in FIG. 4), which does not perform data format conversion (step S25), and is received again by the edge router 61.

When the edge router 61 extracts the source and destination device IDs (step S23), the router determines whether the packet should be output to either the built-in DV-to-MPEG2 converter router 62 or the built-in DV-to-MPEG4 converter router 63 depending upon the extracted device IDs (step S24).

Accordingly, the data includes priority information for data conversion, and allows a higher priority to be set for data which requires real-time data transmission.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A data transmission system for nodes connected to a network, the data transmission system comprising:
    a header-information adding device including:
        (a) a header information adding unit; and
        (b) a packet transmitting unit;
    wherein:
        (a) the header information adding unit adds information unique to:
            (i) a sending node, wherein a first data format is associated with the sending node; and
            (ii) a receiving node, wherein a second data format is associated with the receiving node;
        (b) said added information is added to a header of a transmission packet sent from the sending node to the receiving node;
        (c) the packet transmitting unit transmits the transmission packet; and
        (d) the added information includes:
            (i) at least one of a first device type and a first model type of the sending node; and
            (ii) at least one of a second device type and a second model type of the receiving node; and
    a data format converting device including:
        (a) a packet receiving unit;
        (b) a unique-information detecting unit; and
        (c) a data-format converting unit;
    wherein:
        (a) the packet receiving unit receives the transmission packet transmitted by the packet transmitting unit;
        (b) the unique-information detecting unit detects the information unique to the sending node and the receiving node from the header of the received transmission packet; and
        (c) the data-converting unit:
            (i) refers to information stored in memory to recognize:
                (A) the first data format of the sending node by using said at least one first device type and said first model type added by the header information adding unit; and
                (B) the second data format of the receiving node by using said at least one second device type and said second model type added by the header information adding unit; and
            (ii) converts the first data format of the transmission packet transmitted by the sending node into the second data format of the transmission packet received by the receiving node based on
                (A) said at least one first device type and said first model type added by the header information adding unit; and
                (B) said at least one second device type and said second model type added by the header information adding unit.

2. The data transmission system of claim 1, wherein the data-format converting device further includes a data output for outputting the converted data, and a data-flow-rate measurer for measuring an amount of the data output from the data output.

3. The data transmission system of claim 1, wherein the header-information adding device further includes a priority adding part for adding data-conversion priority to the header of the transmission packet, and the data-format converting device further includes a priority-based converting part for causing the data-format converting device to perform data conversion according to the priority added to the transmission packet.

4. The data transmission system of claim 1, wherein the information unique to the sending node includes an identifier for identifying a device of the sending node, and the information unique to the receiving node includes an identifier for identifying a device of the receiving node.

5. The data transmission system of claim 1, wherein the transmission packet includes address information of the sending node and wherein the address information includes the information unique to the sending node.

6. The data transmission system of claim 1, wherein the transmission packet includes address information of the receiving node and wherein the address information includes the information unique to the receiving node.

7. The data transmission system of claim 1, wherein the transmission packet includes an IP packet.

8. The data transmission system of claim 1, wherein the sending node is a camera.

9. A header-information adding device for nodes connected to a network, the header-information adding device comprising:
- a header-information adding unit for adding information unique to:
  - (a) a sending node wherein a first data format is associated with the sending node; and
  - (b) a receiving node wherein a second data format is associated with the receiving node wherein:
  - (a) said added information is added to a header of a transmission packet sent from the sending node to the receiving node;
  - (b) the information includes:
    - (i) at least one of a first device type and a first model type of the sending node; and
    - (ii) at least one of a second device type and a second model type of the receiving node; and
- a packet transmitting unit for transmitting the transmission packet to a data-format converting device for converting the first data format into the second data format based on:
  - (a) said at least one first device type and said first model type added by the header information adding unit; and
  - (b) said at least one second device type and said second model type added by the header information adding unit.

10. The header-information adding device of claim 9, wherein the sending node is a camera.

11. A data-format converting device for nodes connected to a network, the data-format converting device comprising:
- a packet receiving unit for receiving a packet, sent from a sending node to a receiving node, said packet having information unique to:
  - (a) said sending node, wherein a first data format is associated with the sending node; and
  - (b) said receiving node, wherein a second data format is associated with the receiving node;

wherein:
  - (a) said added information is added to a header of said data packet; and
  - (b) the information includes:
    - (i) at least one of a first device type and a first model type of the sending node; and
    - (ii) at least one of a second device type and a second model type of the receiving node; and
- a unique-information detecting unit for detecting, from the header of the packet received by the packet receiving unit, the information unique to the sending node and to the receiving node; and
- a data-format converting unit for:
  - (a) referring to information stored in memory to recognize:
    - (i) the first data format of the sending node by using said at least one first device type and said first model type added by the header information adding unit; and
    - (ii) the second data format of the receiving node by using said at least one second device type, and said second model type added by the header information adding unit; and
  - (b) converting the first data format of the data packet transmitted by the sending node into the second data format of the data packet received by the receiving node based on:
    - (i) said at least one first device type and said first model type added by the header information adding unit; and
    - (ii) said at least one second device type and said second model type added by the header information adding unit.

12. The data-format converting device of claim 11, wherein the sending node is a camera.

13. A data transmission method for nodes connected to a network, the method comprising:
- receiving a transmission packet sent from a sending node to a receiving node;
- adding information unique to:
  - (a) the sending node, wherein a first data format is associated with the sending node; and
  - (b) the receiving node, wherein a second data format is associated with the receiving node;

wherein:
  - (a) said added information is added to a header of the transmission packet; and
  - (b) the information includes:
    - (i) at least one of a first device type and a first model type of the sending node; and
    - (ii) at least one of a second device type and a second model type of the receiving node;
- transmitting the transmission packet to a data-format converting device;
- receiving the transmission packet at the data format converting device;
- detecting, from the header of the received transmission packet, the information unique to the sending node and to the receiving node;
- referring to information stored in memory to recognize:
  - (a) the first data format of the sending node by using said at least one first device type and said first model type added by the header information adding unit; and
  - (b) the second data format of the receiving node by using said at least one second device type and said second model type added by the header information adding unit; and
- converting the first data format of the transmission packet transmitted by the sending node into the second data format of the transmission packet received by the receiving node based on:
  - (a) said at least one first device type and said first model type added by the header information adding unit.

14. The data transmission method of claim 1, wherein the sending node is a camera.

* * * * *